United States Patent
Singh et al.

(10) Patent No.: US 11,267,754 B2
(45) Date of Patent: Mar. 8, 2022

(54) GLAZING WITH SOLAR PROTECTION PROPERTIES COMPRISING A TITANIUM OXYNITRIDE LAYER

(71) Applicant: SAINT-GOBAIN GLASS FRANCE, Courbevoie (FR)

(72) Inventors: Laura Singh, Paris (FR); Corentin Monmeyran, Le Raincy (FR); Vincent Reymond, Antony (FR); Remy Dodet, Gagny (FR); Jean Lorenzzi, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 26 days.

(21) Appl. No.: 16/626,119

(22) PCT Filed: Jun. 25, 2018

(86) PCT No.: PCT/FR2018/051536
§ 371 (c)(1),
(2) Date: Dec. 23, 2019

(87) PCT Pub. No.: WO2019/002737
PCT Pub. Date: Jan. 3, 2019

(65) Prior Publication Data
US 2020/0216354 A1 Jul. 9, 2020

(30) Foreign Application Priority Data

Jun. 26, 2017 (FR) ...................................... 1755809
Jun. 26, 2017 (FR) ...................................... 1755810

(51) Int. Cl.
*B32B 15/04* (2006.01)
*C03C 17/36* (2006.01)
*C03C 17/34* (2006.01)

(52) U.S. Cl.
CPC ........ *C03C 17/366* (2013.01); *C03C 17/3435* (2013.01); *C03C 17/3626* (2013.01); *C03C 17/3649* (2013.01); *C03C 17/3681* (2013.01)

(58) Field of Classification Search
CPC .............. C03C 17/366; C03C 17/3435; C03C 17/3626; C03C 17/3649; C03C 17/3681

USPC .......................... 428/428, 432, 698, 701, 702
See application file for complete search history.

(56) References Cited

U.S. PATENT DOCUMENTS

| | | | |
|---|---|---|---|
| 5,552,180 A | 9/1996 | Finley et al. | |
| 6,188,512 B1 | 2/2001 | Woodard et al. | |
| 6,274,244 B1 | 8/2001 | Finley et al. | |
| 6,586,871 B1 | 7/2003 | Horie et al. | |
| 6,740,211 B2 * | 5/2004 | Thomsen | B32B 17/10036 156/109 |
| 7,807,248 B2 | 10/2010 | German et al. | |
| 10,294,147 B2 * | 5/2019 | Lu | C23C 14/3464 |
| 2001/0021540 A1 | 9/2001 | Woodard et al. | |
| 2001/0044032 A1 | 11/2001 | Finley et al. | |
| 2003/0042838 A1 | 3/2003 | Horie et al. | |
| 2003/0080671 A1 | 5/2003 | Horie et al. | |
| 2018/0187477 A1 * | 7/2018 | Tucker | C23C 14/0617 |

FOREIGN PATENT DOCUMENTS

| | | |
|---|---|---|
| DE | 10 2012 215 059 A1 | 2/2014 |
| WO | WO 2006/048463 A1 | 5/2006 |
| WO | WO 2017/067078 A1 | 4/2017 |

OTHER PUBLICATIONS

International Search Report dated Oct. 8, 2018 in PCT/FR2018/051536 filed Jun. 25, 2018, 3 pages.

* cited by examiner

*Primary Examiner* — Lauren R Colgan
(74) *Attorney, Agent, or Firm* — Oblon, McClelland, Maier & Neustadt, L.L.P.

(57) ABSTRACT

A glass article with a solar-control function includes at least one glass substrate and a stack of layers deposited on at least one face of the substrate. The stack of layers includes a layer of titanium oxynitride of general formula $TiN_xO_y$, in which $1.00<x<1.20$ and in which $0.01<y<0.10$. The stack of layers further includes layers of dielectric materials and optionally of metallic or nitrided layers based on chromium, nickel, titanium, niobium or a mixture of at least two of these elements.

21 Claims, No Drawings

GLAZING WITH SOLAR PROTECTION PROPERTIES COMPRISING A TITANIUM OXYNITRIDE LAYER

The invention relates to the field of glass substrates or articles, of the building or automotive glazing type, comprising, on their surface, thin-layer coatings providing them with solar-control properties, or even low-emissivity properties. The term "glazing" is understood in the present invention to mean any glass product consisting of one or more glass substrates, in particular single glazings, double glazings, triple glazings, etc. The present invention relates in particular to laminated glazings comprising at least two glass substrates connected together by a layer of plastic such as PVB (polyvinyl butyral) or PU (polyurethane). The expression "solar control" is understood in the present invention to mean the ability of the glazing to limit the energy flux, in particular the flux of infrared (IR) radiation, passing through it from the exterior to the interior of the dwelling or passenger compartment, while preserving a light transmission that enables vision at least from the interior to the exterior of the building or passenger compartment that it equips.

A low-emissivity stack is understood to mean stacks that incorporate at least one functional layer operating essentially on the mode of reflecting a major portion of the middle IR (infrared) radiation.

Such glazings equipped with stacks of thin layers thus act on the incident solar radiation and enable solar protection and/or thermal insulation of the passenger compartment or dwelling. Moreover, these coatings must be esthetically pleasing, i.e. they must have a sufficiently neutral colorimetry, both in transmission and in reflection, so as not to inconvenience users or alternatively a blue or green tint, in particular in the building field. Alternatively, other glazings according to the invention may have another color in exterior reflection, in particular bronze or any other desired color, or even have a reflective appearance seen from the exterior of the building. These coatings are conventionally deposited by CVD deposition techniques for the simplest cases or most often, currently, by vacuum sputtering deposition techniques, often referred to as magnetron sputtering in the field, in particular when the coating consists of a more complex stack of successive layers.

Usually, stacks of thin layers having solar control properties comprise one or even several active layers. An "active layer" or else "functional layer" is understood to mean a layer that acts noticeably on the flux of solar or thermal radiation passing through said glazing. Such an active layer, in a known manner, may operate either mainly in reflection mode, reflecting the incident infrared radiation, or mainly in absorption mode, absorbing the incident infrared radiation.

In particular, the best-performing stacks currently sold incorporate at least one metallic layer of silver type operating essentially on the mode of reflecting a major portion of the incident IR (infrared) radiation. A strong reflection of the middle infrared radiation also imparts the property of low emissivity. These layers are however very sensitive to moisture and are therefore exclusively used in double glazings, on face 2 or 3 thereof in order to be protected from moisture. The stacks according to the invention do not comprise such layers of silver (in particular gold, platinum, copper, aluminum) type.

Other metallic layers having a solar-control function have also been reported in the field, comprising functional layers of Nb, Ta or W type or of nitrides of these metals, as described for example in application WO 01/21540. However, within such layers, the solar radiation is this time absorbed and/or reflected but not very selectively, that is to say that the IR radiation (the wavelength of which is between around 780 nm and 2500 nm) and the visible radiation are also absorbed/reflected non-selectively. Such glazings thus have little or no selectivity, and generally have a high emissivity.

Conventionally, in the field of insulating glazings, the selectivity is usually expressed as the ratio between the light transmission factor and the solar factor g (or SF). These quantities are in particular defined in the standard NF EN 410.

Conventionally and as is known, the light transmission factor or light transmission $T_L$ corresponds to the percentage of the incident light flux, i.e. in the wavelength range from 380 to 780 nm, passing through the glazing, under the illuminant $D_{65}$.

As is known, the solar factor g is itself equal to the ratio of the energy passing through the glazing (i.e. entering the premises) to the incident solar energy. More particularly, it corresponds to the sum of the flux transmitted directly through the glazing and the flux absorbed by the glazing (including the stacks of layers optionally present on one of its surfaces) and then possibly re-emitted toward the interior (the premises).

Generally, all the luminous characteristics presented in the present description are obtained according to the principles and methods described in the European (and French) standard EN 410 relating to the determination of the luminous and solar characteristics of glazings used as glass in building.

The objective of the present invention is thus to provide glazings comprising a stack of layers that give them solar-control properties, preferably with low-emissivity properties (i.e. properties of reflection of the far infrared), for example a normal emissivity of less than 0.5, or even of less than 0.4 and having a high selectivity, within the meaning described previously, i.e. an optimized $T_L/g$ ratio, in particular close to 1, or even greater than 1, said stack being durable over time with no specific precaution.

Emissivity is understood to mean the normal emissivity as measured in annex A of the standard ISO 10292 (1994).

A glazing according to a first aspect of the present invention thus advantageously makes it possible to select the radiation passing through it, by favoring the transmission of light waves in the visible range, i.e. the wavelength of which is between around 380 and 780 nm, by selectively absorbing and/or reflecting the majority of the infrared radiation, i.e. the wavelength of which is greater than 780 nm, in particular near infrared radiation, i.e. the wavelength of which is between around 780 nm and around 3000 nm, and by reflecting the middle infrared radiation, from 3 μm to 50 μm. Preferably, the glazings according to this first aspect of the present invention have a high light transmission, i.e. typically greater than 20%, or greater than 25%, or greater than 30%, or else greater than 40% or even greater than 50%.

According to this first aspect of the invention, it is thus possible to maintain a strong illumination of the room or passenger compartment protected by the glazing while minimizing the amount of heat entering therein.

According to another aspect of the invention, it is thus possible to limit radiative transfers between the interior and exterior of the room or passenger compartment by providing glazings having a low emissivity.

According to another optional aspect of the present invention, it is sought to provide solar-control glazings of which said stack gives said glazing a substantially neutral color in transmission and in exterior reflection or else a blue-green tint, as desired in particular in the building sector.

A neutral color is understood, for the purposes of the present invention, to mean, in the (L*, a*, b*) colour system, b* values and a* values close to zero, in particular less than 10, or even less than 5, as absolute values.

A blue-green color is understood, for the purposes of the present invention, to mean, in the (L*, a*, b*) colour system, negative b* values, in particular less than −10, or even less than −15 and a* values close to zero, in particular less than 10, or even less than 5, as absolute values.

In the case where the solar-control glazing according to the invention is a laminated glazing within the meaning described previously, it also becomes possible to obtain neutral colors, in particular having values of the a* and b* parameters that are less than 5, as absolute values.

According to another aspect, as is also currently sought, in particular in the building field, it is possible, according to certain configurations of the present invention, to provide glazings having a mirror effect, i.e. a high exterior light reflection, in particular of the order of 15% to 40%, in particular from 20% to 40%, in such a way that the glazing appears to be a mirror surface when seen from the exterior of the building but such that vision however remains possible and easy from the interior to the exterior of the building. Such an arrangement may lead to a great reduction in the light transmission through the glazing and possibly a substantial reduction in the selectivity of the glazing, within the meaning described previously. In the case of such a creation of a glazing with high reflectivity, the present invention makes it possible to provide glazings having such a mirror effect, i.e. a high exterior reflection, within the meaning described previously, and also enables the maintenance of solar-control properties and the preservation of a relatively high selectivity, within the meaning described previously, i.e. an optimized $T_L/g$ ratio, in particular of the order of 1 or slightly less than 1, and in any case substantially improved relative to the glazings proposed in the aforementioned application WO 01/21540.

In particular, the applicant company has discovered that such objectives could be achieved by the use, on glass substrates, of stacks of layers of which all the functional layers, i.e. all the layers of the stack reflecting/absorbing most of the solar infrared radiation, are titanium oxynitride layers. Very particularly, according to the invention, it was found that very good emissivity, selectivity and colorimetry values, within the meaning described previously, could be obtained in such stacks owing to the action of such layers, for controlled oxygen and nitrogen contents as described subsequently. In particular, even though oxygen is considered in the art to be an impurity that is highly detrimental to the energy properties of the nitride-type functional layers, it was found that very good selectivities and even low emissivities could be obtained for compounds comprising very specific proportions of the elements Ti, O and N, while controlling the colorimetry of such glazings, in particular their exterior appearance.

More specifically, the present invention relates to a glass article with a solar-control function comprising at least one glass substrate and a stack of layers deposited on at least one face of said substrate, said stack of layers comprising at least one layer of titanium oxynitride of general formula $TiN_xO_y$, wherein 1.00<x<1.20 and wherein 0.01<y<0.10, said stack of layers consisting, in addition to said titanium oxynitride layer(s), of layers of dielectric materials and optionally of metallic layers based on chromium, nickel, titanium, niobium or a mixture of at least two of these elements, or of layers of the nitride of such metals.

A dielectric material is understood to mean any material having a solid form, free of impurities, which has a resistivity initially of greater than $10^{10}$ ohms-meters (Ω·m). Such materials, once deposited as thin layers, may however comprise additional elements that substantially increase their electrical conductivity, which are useful in particular for improving the cathode sputtering efficiency of the precursor material constituting the magnetron target. For example, silicon nitride layers used in the stack according to the invention may comprise a small amount of aluminum, the silicon metal target conventionally used during cathode sputtering for example comprising, in general, from 6% to 10% by weight of aluminum, in order to increase the conductivity thereof.

According to preferred embodiments of the present invention, which may optionally be combined together:

In the glass article, 0.02<y<0.08.
In the glass article, 1.05<x<1.20.
The thickness of the titanium oxynitride layer(s) is between 10 and 80 nanometers, in particular between 10 and 60 nanometers, and very particularly between 15 and 50 nanometers.
The stack further incorporates, below and/or above the titanium oxynitride layer, one or more layers of dielectric materials.
The dielectric material or materials are chosen from silicon nitride optionally doped with Al, Zr or B, aluminum nitride, tin oxide, a mixed oxide of zinc or tin $Sn_yZn_zO_x$, silicon oxide, titanium oxide and silicon oxynitrides $SiO_xN_y$. Preferably, the dielectric material is silicon nitride optionally doped with Al, Zr or B.
The stack further incorporates, below and/or optionally above the titanium oxynitride layer, a layer of a metal, optionally partially or completely oxidized and/or nitrided, said metal being based on chromium, nickel, titanium, niobium or a mixture of at least two of these elements, said layer having for example a thickness of less than 10 nm, in particular less than 5 nm, in particular a thickness of less than 3 nm. The metal is chosen from Ti, Nb or an alloy of nickel and chromium, said metal or alloy being optionally nitrided. Very particularly preferably, the metal is an alloy of nickel and chromium, optionally and more preferably nitrided.
The stack comprises or consists of the series of the following layers, starting from the surface of the glass substrate:
a layer based on silicon nitride, having a thickness preferably of between 20 and 80 nm, preferably between 25 and 70 nm,
optionally a layer of a metal, optionally partially or completely oxidized and/or nitrided, said metal being based on chromium, nickel, titanium, niobium or a mixture of at least two of these elements, said layer having for example a thickness of less than 10 nm, or even less than 5 nm, or less than 3 nm,
said layer of titanium oxynitride of general formula $TiN_xO_y$, having a thickness of between 10 and 80 nm, preferably between 15 and 60 nanometers, and more preferably between 15 and 50 nanometers,
optionally a layer of a metal, optionally partially or completely oxidized and/or nitrided, said metal being based on chromium, nickel, titanium, niobium or a mixture of at least two of these elements, said layer having for example a thickness of less than 10 nm, or even less than 6 nm, or less than 5 nm, or even less than 3 nm, a layer based on silicon nitride, having a thickness of between 20 and 80 nm, preferably between 25 and 70 nm, optionally an upper layer based on a titanium oxide, a zirconium oxide or a titanium zirconium oxide or even based on a silicon oxide.

The stack comprises or consists of the series of the following layers, starting from the surface of the glass substrate:

- a layer based on silicon nitride, having a thickness of between 20 and 80 nm, preferably between 25 and 70 nm,
- a first layer of titanium oxynitride of general formula $TiN_xO_y$, wherein $1.00<x<1.20$ and wherein $0.01<y<0.10$, having a thickness of between 10 and 80 nm, preferably between 20 and 60 nanometers, and more preferably between 30 and 50 nanometers,
- a layer based on silicon nitride, having a thickness of between 20 and 80 nm, preferably between 25 and 70 nm,
- a second layer of titanium oxynitride of general formula $TiN_xO_y$, wherein $1.00<x<1.20$ and wherein $0.01<y<0.10$, having a thickness of between 10 and 80 nm, preferably between 20 and 60 nanometers, and more preferably between 30 and 50 nanometers,
- a layer based on silicon nitride, having a thickness of between 20 and 80 nm, preferably between 25 and 70 nm,
- optionally an upper layer based on a titanium oxide, a zirconium oxide or a titanium zirconium oxide.

Said article is a glazing comprising only a single glass substrate.

Said article has undergone a heat treatment such as a tempering, a bending or else an annealing, in particular performed by a laser.

Said article is a laminated glazing consisting of an assembly of at least two glass substrates connected together by a thermoplastic sheet, in particular of polyvinyl butyral (PVB).

According to one particular embodiment of the invention, the glass article with a solar-control function comprises at least one glass substrate and a stack of layers deposited on at least one face of said substrate, and said stack of layers comprises at least:

- a first layer of titanium oxynitride of general formula $TiN_xO_y$, wherein $1.00<x<1.20$ and wherein $0.01<y<0.10$, the thickness of said first layer of titanium oxynitride being between 10 and 80 nanometers,
- a metallic second layer based on chromium, nickel, titanium, niobium or a mixture of at least two of these elements, said second layer optionally being nitrided, said second layer being positioned between the first layer of titanium oxynitride and said face of said substrate or above the first layer of titanium oxynitride in the stack.

Advantageously, according to this embodiment, the stack consists of said at least first and second layers and of layers of dielectric materials and preferably the second layer is positioned between the first layer of titanium oxynitride and said face of said substrate. The thickness of said first layer of titanium oxynitride is in particular between 10 and 30 nanometers, and very particularly between 10 and 25 nanometers. The thickness of said optionally nitrided metallic second layer is advantageously between 3 and 15 nm, in particular is between 5 and 10 nanometers. According to one favored realization of this embodiment, the thickness of said first layer is greater than the thickness of said second layer by a factor at least equal to 1.3, preferably by a factor equal to at least 1.5 or even by a factor at least equal to 2, or at least equal to 2.5.

Typically, the metallic second layer is deposited directly on said face of said substrate. Said first layer and said second layer are preferably in contact with one another. Alternatively, said first layer and said second layer may be separated by at least one layer of dielectric material.

Preferably according to this embodiment, $1.05<x<1.18$.

Preferably according to this embodiment, $0.02<y<0.08$.

In such a glass article, the dielectric material or materials are chosen from silicon nitride optionally doped with Al, Zr or B, aluminum nitride, tin oxide, a mixed oxide of zinc or tin $Sn_yZn_zO_x$, silicon oxide, titanium oxide and silicon oxynitrides $SiO_xN_y$. Preferably, the dielectric material is silicon nitride optionally doped with Al, Zr or B.

Advantageously, the second layer is a layer of nickel and chromium, preferentially which is nitrided.

According to one preferential embodiment, said stack consists of a series of said first and second layers and optionally of layers of dielectric materials separating said first and second layers.

In particular, the invention relates to a glass article as described above, wherein the stack comprises or consists of the series of the following layers, starting from the surface of the glass substrate:

- at least said metallic second layer based on chromium, nickel, titanium, niobium or a mixture of at least two of these elements, said layer being optionally nitrided, said layer preferably being a layer of nickel and chromium, preferentially which is nitrided, said layer preferably having a thickness of between 3 and 15 nanometers, preferably between 5 and 10 nanometers, said layer preferably being a layer of nickel and chromium, preferentially which is nitrided,
- optionally one or more lower layers of dielectric materials, in particular based on silicon nitride, having a thickness, in total, of between 10 and 120 nm,
- said first layer of titanium oxynitride of general formula $TiN_xO_y$, wherein $0.01<y<0.10$, preferably $0.02<y<0.08$, and wherein $1.00<x<1.20$, preferably $1.05<x<1.18$, having a thickness of between 10 and 80 nm, preferably between 10 and 30 nanometers, and more preferably between 10 and 25 nanometers,
- optionally at least one metallic layer based on chromium, nickel, titanium, niobium or a mixture of at least two of these elements, said layer being optionally nitrided, said layer having for example a thickness of less than 10 nm, or even less than 5 nm, or less than 3 nm, said layer preferably being a layer of nickel and chromium, preferentially which is nitrided,
- one or more upper layers of dielectric materials, in particular based on silicon nitride, having a physical thickness, in total, of between 10 and 100 nm,
- optionally an upper layer based on a titanium oxide, a zirconium oxide or a titanium zirconium oxide or else based on silicon oxide.

According to a first aspect of the embodiment described above, the invention relates to a glass article as described above, wherein the stack comprises or consists of the series of the following layers, starting from the surface of the glass substrate:

- a metallic layer based on chromium, nickel, titanium, niobium or a mixture of at least two of these elements, said layer being optionally nitrided, said layer having a thickness of between 3 and 15 nanometers, preferably between 5 and 10 nanometers, said layer preferably being a layer of nickel and chromium, preferentially which is nitrided, a layer of titanium oxynitride of general formula $TiN_xO_y$, wherein $0.01<y<0.10$, preferably $0.02<y<0.08$, and wherein $1.00<x<1.20$, preferably $1.05<x<1.18$, having a thickness of between 10 and 80 nm, preferably between 10 and 30 nanometers, and more preferably between 10 and 25 nanometers, a layer based on silicon nitride, having a thickness of between 20 and 80 nm, preferably between 25 and 70 nm, optionally an upper layer based on a titanium oxide, a zirconium oxide or a titanium zirconium oxide.

According to a second alternative aspect of the embodiment described above, the invention relates to a glass article wherein the stack comprises or consists of the series of the following layers, starting from the surface of the glass substrate:

a metallic layer based on chromium, nickel, titanium, niobium or a mixture of at least two of these elements, said layer being optionally nitrided, said layer having a thickness of between 3 and 15 nanometers, preferably between 5 and 10 nanometers, said layer preferably being a layer of nickel and chromium, preferentially which is nitrided, a layer based on silicon nitride, having a thickness of between 50 and 120 nm, preferably between 70 and 100 nm, a layer of titanium oxynitride of general formula $TiN_xO_y$, wherein $0.01<y<0.10$, preferably $0.02<y<0.08$, and wherein $1.00<x<1.20$, preferably $1.05<x<1.18$, having a thickness of between 10 and 80 nm, preferably between 10 and 50 nanometers, and more preferably between 10 and 30 nanometers, a layer based on silicon nitride, having a thickness of between 20 and 80 nm, preferably between 30 and 60 nm, optionally an upper layer based on a titanium oxide, a zirconium oxide or a titanium zirconium oxide.

Said article as described above may be a glazing comprising only a single glass substrate, said stack being positioned on at least one face of said glazing. Such an article may have undergone a heat treatment such as a tempering, a bending or else an annealing.

Alternatively, said article is a laminated glazing consisting of an assembly of at least two glass substrates connected together by a thermoplastic sheet, in particular of polyvinyl butyral (PVB), said stack being positioned preferably on at least one face of one of the glass substrates directed toward the interior of said laminated glazing.

The glass article according to the invention may be a laminated glazing, a double glazing (consisting of two glass panels separated by a gas-filled space) or else an assembly of a composite glazing consisting of a laminated glazing as described above included in a structure of double glazing type.

The examples which follow are given purely by way of illustration and do not limit the scope of the present invention in any of the aspects described. For comparison purposes, all the stacks of the examples which follow are synthesized on glass substrates mounted as single glazing.

All the layers of the stacks were deposited according to conventional magnetron sputtering vacuum deposition techniques.

According to a first series of experiments (examples 1 to 5 which follow), the possibility according to the invention of obtaining glazings having a high light transmission (close to 50%) while preserving a high selectivity and good solar-control properties is demonstrated.

EXAMPLE 1 (ACCORDING TO THE INVENTION)

In this example according to the invention, a stack consisting of the sequence of the following layers:

| Glass | /$Si_3N_4$ (31 nm) | /$TiN_xO_y$ (19 nm) | /$Si_3N_4$ (29 nm) |
|---|---|---|---| was deposited, according to conventional magnetron techniques, on a substrate made of Planilux® glass.

The $TiN_xO_y$ layer is obtained by the magnetron sputtering technique from a titanium metal target in an atmosphere very largely of nitrogen and argon, but containing an amount of oxygen of the order of 2% by volume.

The silicon nitride layers are deposited according to the conventional techniques in the field, from a silicon target comprising 8% by weight of aluminum in an atmosphere of nitrogen and argon.

The main characteristics of the deposition process are reported in the following table:

| Line speed (m/min) | | 1.7 |
|---|---|---|
| $Si_3N_4$ | Cathode power (kW) | 64 |
| | Pressure (μbar) | 4 |
| | Flux Ar (sccm) | 700 |
| | Flux $N_2$ (sccm) | 850 |
| $TiN_xO_y$ | Power (kW) | 87 |
| | Pressure (μbar) | 6 |
| | Flux Ar (sccm) | 1600 |
| | Flux $N_2 + O_2$ (sccm) | 500 |
| $Si_3N_4$ | Power (kW) | 78 |
| | Pressure (μbar) | 4 |
| | Flux Ar (sccm) | 700 |
| | Flux $N_2$ (sccm) | 850 |

According to the invention, the glazing thus obtained is used as single glazing or as a first substrate for obtaining a laminated glazing by lamination with another substrate made of Planilux® glass using a sheet of PVB, the stack being positioned between the two glass substrates in the final glazing.

The factors $T_L$ and g were measured on the single glazing and the laminated glazing thus obtained in order to thereby determine the selectivity. The results are reported in table 1. Their colorimetric properties were also measured below. The results are reported in table 3 below.

EXAMPLE 2 (COMPARATIVE)

This example was carried out in an identical manner to example 1 and a substantially identical stack was obtained, with the exception that the flow rate of nitrogen in the sputtering chamber was increased to 800 sccm, so as to increase the value of x.

As for example 1, the glazing thus obtained is used as single glazing or as a first substrate for obtaining a laminated glazing by lamination with another substrate made of Planilux® glass using a sheet of PVB, the stack being positioned between the two glass substrates in the final glazing.

The factors $T_L$ and g were measured on the single glazing and the a laminated glazing thus obtained in order to thereby determine the selectivity. The results are reported in table 1.

EXAMPLE 3 (ACCORDING TO THE INVENTION)

In this example according to the invention, a stack consisting of the sequence of the following layers:

| Glass | /$Si_3N_4$ (61 nm) | /$TiN_xO_y$ (39 nm) | /$Si_3N_4$ (60 nm) |
|---|---|---|---| was deposited, according to conventional magnetron techniques, on a substrate made of Planilux® glass.

The $TiN_xO_y$ layer is obtained by magnetron sputtering from a titanium metal target in an atmosphere very largely of nitrogen and argon, but containing an amount of oxygen of the order of 2% by volume.

The main characteristics of the deposition process are reported in the following table:

| Line speed (m/min) | | 0.9 |
|---|---|---|
| $Si_3N_4$ | Cathode power (kW) | 80 |
| | Pressure (μbar) | 4 |
| | Flux Ar (sccm) | 700 |
| | Flux $N_2$ (sccm) | 850 |
| $TiN_xO_y$ | Power (kW) | 97 |
| | Pressure (μbar) | 6 |
| | Flux Ar (sccm) | 1600 |
| | Flux $N_2$ + $O_2$ (sccm) | 500 |
| $Si_3N_4$ | Power (kW) | 70 |
| | Pressure (μbar) | 4 |
| | Flux Ar (sccm) | 700 |
| | Flux $N_2$ (sccm) | 850 |

As for example 1, the glazing thus obtained is used as single glazing or as a first substrate for obtaining a laminated glazing by lamination with another substrate made of Planilux® glass using a sheet of PVB, the stack being positioned between the two glass substrates in the final glazing.

The factors $T_L$ and g were measured on the single glazing and the laminated glazing thus obtained in order to thereby determine the selectivity. The results are reported in table 2. Their colorimetric properties were also measured below. The results are reported in table 3 below.

EXAMPLE 4 (COMPARATIVE)

This example was carried out in an identical manner to example 3 and a substantially identical stack was obtained, with the exception that a greater amount of oxygen was introduced into the sputtering chamber, this amount being of the order of 5% by volume in the largely nitrogen and argon atmosphere.

As for the preceding examples, the glazing thus obtained is used as single glazing (S) or as a first substrate for obtaining a laminated glazing (F) by lamination with another substrate made of Planilux® glass using a sheet of PVB, the stack being positioned between the two glass substrates in the final glazing.

The factors $T_L$ and g were measured on the single glazing and the laminated glazing thus obtained in order to thereby determine the selectivity. The results are reported in table 2.

EXAMPLE 5 (COMPARATIVE)

In this example, use was made of a glazing from the applicant company sold under the reference Cool-Lite ST120, the stack of which comprises a layer of niobium nitride as layer that reflects/absorbs solar radiation, surrounded by two silicon nitride layers.

The factors $T_L$ and g were measured on these glazings, under the same conditions as above, in order to thereby determine the selectivity. The results are reported in table 2.

As for example 1, the glazing thus obtained is used as single glazing (S) or as a first substrate for obtaining a laminated glazing (F) by lamination with another substrate made of Planilux® glass using a sheet of PVB, the stack being positioned between the two glass substrates in the final glazing.

The factors $T_L$ and g were measured on the single glazing and the laminated glazing thus obtained in order to thereby determine the selectivity. The results are reported in table 2.

The values of x and y in the titanium oxynitride layers are measured conventionally by XPS (X-ray photoelectron spectroscopy) techniques on a Nova-Kratos machine according to the following conditions:

Analysis Conditions:
Source: monochromatized Al Kα
300 Watts for particular spectra
Area analyzed: 110×110 μm² (μspot mode)
Detection angle: normal (θ=0°)
Depth analyzed less than 10 nm in normal detection
Abrasion Conditions:
Ions: Ar—2.0 keV
Sweep: 3×3 mm² centered on the analysis zone
Abrasion cycles/time per cycle: 30 cycles of 1 minute.

The characteristics of the various glazings obtained for examples 1 and 2, measured according to the standards specified above, are reported in table 1 below:

TABLE 1

| | Example 1 | | Example 2 | |
|---|---|---|---|---|
| Glazing type | S* | F* | S* | F* |
| Functional layer | $TiN_xO_y$ | | $TiN_xO_y$ | |
| x | 1.16 | 1.16 | 1.20 | 1.20 |
| y | 0.03 | 0.03 | 0.03 | 0.03 |
| $T_L$ (%) | 49.1 | 49.7 | 46.7 | 48.6 |
| g (%) | 45.8 | 44.9 | 45.4 | 45.6 |
| Selectivity ($T_L$/g) | 1.07 | 1.11 | 1.03 | 1.07 |
| Emissivity (%) | 45 | N.A. | 45 | N.A. |

*S: single glazing - F: laminated glazing
* N.A.: not applicable

TABLE 2

| | Example 3 | | Example 4 | | Example 5 | |
|---|---|---|---|---|---|---|
| Glazing type | S* | F* | S* | F* | S* | F* |
| Functional layer | $TiN_xO_y$ | | $TiN_xO_y$ | | NbN | |
| x | 1.16 | 1.16 | 1.16 | 1.16 | N.A. | N.A. |
| y | 0.03 | 0.03 | 0.1 | 0.1 | N.A. | N.A. |
| $T_L$ (%) | 32.1 | 28.9 | 37.8 | 34.3 | 21.0 | 21.0 |
| g (%) | 29.8 | 30.9 | 34.7 | 34.7 | 30.0 | 29.5 |
| Selectivity ($T_L$/g) | 1.08 | 0.93 | 1.09 | 0.95 | 0.70 | 0.71 |
| Emissivity (%) | 26 | N.A. | 40 | N.A. | 64 | N.A. |

*S: single glazing - F: laminated glazing
*N.A.: not applicable

The comparison of the data reported in tables 1 and 2 shows that a greater selectivity is obtained when the stack in question comprises a functional layer having a nitrogen content x that is in accordance with the invention, as shown by the comparison of examples 1 and 2, whereas the best emissivity, i.e. the lowest, is obtained for lower oxygen contents, as shown by the comparison of examples 3 and 4. The present invention enables the optimization of these two parameters, high selectivity and low emissivity. In particular, the applicant company has been able to show, through the examples reported in the present application, that in such titanium oxynitride layers the very precise control of the composition of said layer, in particular of the values of x and y, made it possible to optimize both the selectivity and the emissivity of the glazing.

The colorimetric characteristics of the glazing according to example 1 and according to example 3, in the (CIE L*b*a*) international system, were also measured in transmission and in external reflection (exterior side). The substrate equipped with its stack was also subjected to a heat treatment consisting in heating at 650° C. for several minutes followed by a tempering. This treatment is representative of the conditions undergone by the glazing if the latter has to be tempered or else bent.

All the optical data are reported in table 3 below:

TABLE 3

| | | Light transmission | | | | Exterior reflection | | |
|---|---|---|---|---|---|---|---|---|
| | | $T_L$ | g | $T_L$/g | $a^*_T$ | $b^*_T$ | $R_{Lext}$ | $a^*_{Rext}$ | $b^*_{Rext}$ |
| Example 1 | Single glazing | 49.1 | 45.8 | 1.07 | −2.2 | −2.8 | 10.9 | −2.2 | −9.5 |
| | Tempered single glazing | 55.2 | 48.3 | 1.14 | −2.4 | 0.9 | 12.9 | −3.8 | −13.2 |
| | Laminated glazing | 49.7 | 44.9 | 1.11 | −3.4 | −2 | 10.9 | 0.9 | −0.1 |
| Example 3 | Single glazing | 32.1 | 29.8 | 1.08 | −2.9 | 8.8 | 21.3 | −2.2 | 7.0 |
| | Tempered single glazing | 40.4 | 33.2 | 1.2 | −4.6 | 9.1 | 19.7 | 4.0 | −0.6 |
| | Laminated glazing | 28.9 | 30.9 | 0.93 | −4.5 | 2.8 | 17.4 | 1.1 | 3.3 |

The data reported in table 3 show the ideal colorimetric properties in transmission and in exterior reflection of glazings equipped with stacks according to the invention:

- In transmission, the parameters $a^*_T$ and $b^*_T$ remain relatively low, providing a relatively neutral color in transmission.
- In reflection, the parameter $a^*_{ext}$ according to the glazings according to the invention is relatively low and often negative, whereas the parameter b* is close to 0 for the laminated glazings (neutral color in reflection), i.e. highly negative for the single glazing according to example 1, which provides a blue color of the glazing as desired in exterior view.

Such colorimetric properties therefore result in a neutral or blue-green color of the glazings in transmission but above all in exterior reflection, as is currently desired in the building field.

According to another advantage, the solar-control stacks according to the present invention, the active layer(s) of which are based on a titanium oxynitride, are extremely simple to manufacture, in particular by the cathode sputtering vacuum deposition technique referred to as magnetron sputtering.

Moreover, supplementary durability tests have shown that such layers could easily be deposited on face 2 of a single glazing, without risk of degradation thereof, by chemical action (moisture) or by mechanical action (abrasion of the stack).

EXAMPLE 6 (ACCORDING TO THE INVENTION)

In this example according to the invention, it is sought to obtain a glass article according to the invention having a high exterior light reflection while preserving a good selectivity, and also a neutral colorimetry in exterior reflection as desired in the building field.

For this, a stack consisting of the sequence of the following layers:

| Glass | /NiCrN (8 nm) | /TiN$_x$O$_y$ (13 nm) | /Si$_3$N$_4$ (52 nm) |
|---|---|---|---| was deposited, according to conventional magnetron techniques, on a substrate made of Planilux® glass.

The TiN$_x$O$_y$ layer is obtained by the magnetron sputtering technique from a titanium metal target in an atmosphere largely of nitrogen and argon, but containing an amount of oxygen of the order of 2% by volume. Values of x=1.18 and y=0.07 in the TiN$_x$O$_y$ titanium oxynitride layer are measured conventionally by the XPS techniques described above.

The silicon nitride layers are deposited according to the conventional techniques in the field, from a silicon target comprising 8% by weight of aluminum in an atmosphere of nitrogen and argon.

The NiCrN layer is deposited from the sputtering of an NiCr target in an argon and nitrogen atmosphere, the elements Ni and Cr being present in the target in the following proportions: 80 wt % of Ni and 20 wt % of Cr.

The main characteristics of the deposition process are reported in the following table:

| Line speed (m/min) | | 2 |
|---|---|---|
| NiCrN | Cathode power (kW) | 19 |
| | Pressure (μbar) | 3.5 |
| | Flux Ar (sccm) | 1150 |
| | Flux N$_2$ (sccm) | 600 |
| TiN$_x$O$_y$ | Power (kW) | 92 |
| | Pressure (μbar) | 6 |
| | Flux Ar (sccm) | 1600 |
| | Flux N$_2$ + O$_2$ (sccm) | 500 |
| Si$_3$N$_4$ | Power (kW) | 150 |
| | Pressure (μbar) | 4 |
| | Flux Ar (sccm) | 700 |
| | Flux N$_2$ (sccm) | 850 |

According to the invention, the glazing thus obtained can be used as single glazing or as a first substrate for obtaining a laminated glazing by lamination with another substrate made of Planilux® glass using a sheet of PVB, the stack being positioned between the two glass substrates in the final glazing.

The factors $T_L$ and g were measured on the single glazing and the laminated glazing thus obtained in order to thereby determine the selectivity and their colorimetric properties. The results are reported in the tables below.

EXAMPLE 7 (ACCORDING TO THE INVENTION)

In this example according to the invention, another stack consisting of the sequence of the following layers:

| Glass | /NiCrN (6 nm) | /Si$_3$N$_4$ (93 nm) | /TiN$_x$O$_y$ (25 nm) | /Si$_3$N$_4$ (46 nm) |
|---|---|---|---|---| was deposited, according to conventional magnetron techniques, on a substrate made of Planilux® glass.

The TiN$_x$O$_y$, NiCrN and Si$_3$N$_4$ layers are obtained according to the same principles as disclosed above.

Values of x=1.13 and y=0.07 in the TiN$_x$O$_y$ titanium oxynitride layer are measured conventionally by the XPS techniques described above.

The main characteristics of the deposition process are reported in the following table:

| | | |
|---|---|---|
| Line speed (m/min) | | 1.3 |
| NiCrN | Cathode power (kW) | 12.5 |
| | Pressure (µbar) | 3.5 |
| | Flux Ar (sccm) | 1150 |
| | Flux N$_2$ (sccm) | 600 |
| Si$_3$N$_4$ | Cathode power (kW) | 150 |
| | Pressure (µbar) | 4 |
| | Flux Ar (sccm) | 700 |
| | Flux N$_2$ (sccm) | 850 |
| TiN$_x$O$_y$ | Cathode power (kW) | 80 |
| | Pressure (µbar) | 6 |
| | Flux Ar (sccm) | 1600 |
| | Flux N$_2$ + O$_2$ (sccm) | 500 |
| Si$_3$N$_4$ | Cathode power (kW) | 90 |
| | Pressure (µbar) | 4 |
| | Flux Ar (sccm) | 700 |
| | Flux N$_2$ (sccm) | 850 |

In the same way as for the preceding example, the glazing thus obtained is used as single glazing or as a first substrate for obtaining a laminated glazing by lamination with another substrate made of Planilux® glass using a sheet of PVB, the stack being positioned between the two glass substrates in the final glazing.

The factors $T_L$ and g were measured on the single glazing and the laminated glazing thus obtained in order to thereby determine the selectivity and their colorimetric properties. The results are reported in the tables below.

EXAMPLE 8 (COMPARATIVE)

In this example, use was made of a glazing from the applicant company sold under the reference Cool-Lite STB120, the stack of which comprises a layer of niobium nitride as layer that reflects/absorbs solar radiation, surrounded by two silicon nitride layers.

The factors $T_L$ and g were measured on the single glazing and the laminated glazing thus obtained in order to thereby determine the selectivity and their colorimetric properties. The results are reported in the tables below.

The selectivity characteristics of the various glazings obtained, measured according to the specified standards, are reported in table 4 below:

TABLE 4

| | | Example 6 | Example 7 | Example 8 |
|---|---|---|---|---|
| $R_{Lext}$ | Single glazing | 31 | 21 | 21 |
| | Laminated glazing | 31 | 21 | 21 |
| $T_L$ (%) | Single glazing | 33 | 27 | 22 |
| | Laminated glazing | 31 | 26 | 22 |
| g (%) | Single glazing | 33 | 31 | 32 |
| | Laminated glazing | 33 | 32 | 33 |
| Selectivity ($T_L$/g) | Single glazing | 1.00 | 0.88 | 0.66 |
| | Laminated glazing | 0.94 | 0.80 | 0.67 |

The comparison of the data reported in table 4 shows that a greater selectivity is obtained for a stack comprising the two layers in accordance with the present invention, i.e. for the stack from examples 6 and 7, and which is even equal to 1 for the stack according to example 6, despite the presence of the highly reflective layer made of NiCrN.

The colorimetric characteristics of the glazing according to examples 6 to 8 were also measured in the (CIE L*b*a*) international system in transmission and in external reflection (exterior side).

All the optical data are reported in table 5 below:

TABLE 5

| | | LIGHT TRANSMISSION | | | EXTERIOR REFLECTION | | |
|---|---|---|---|---|---|---|---|
| | Example | $T_L$ | a*$_T$ | b*$_T$ | $R_{Lext}$ | a*$_{Rext}$ | b*$_{Rext}$ |
| Example 6 | Single glazing | 33 | −2.5 | 2.5 | 31 | −2.5 | −1.0 |
| | Laminated glazing | 31 | −2.7 | 2.7 | 31 | −2.5 | −0.8 |
| Example 7 | Single glazing | 27 | −4.0 | 0.0 | 21 | −4.0 | −18.0 |
| | Laminated glazing | 26 | −3.6 | −2.5 | 21 | −0.5 | −18.0 |
| Example 8 | Single glazing | 22 | −1.4 | 0.5 | 21 | −2.9 | −16 |
| | Laminated glazing | 22 | −1.4 | 2.7 | 21 | −3.6 | −10.8 |

The data reported in table 5 show the ideal colorimetric properties in transmission and in exterior reflection of the glazings equipped with stacks according to the invention:

In transmission, the parameters a*$_T$ and b*$_T$ are usually negative and remain relatively low, providing a relatively neutral color in transmission.

In reflection, the parameter $a^*_{Rext}$ according to the glazings according to the invention is always relatively low and usually negative, whereas the parameter $b^*_{Rext}$ is either close to 0 for example 6, which provides a neutral color in reflection, or highly negative (example 7), which provides a blue color in reflection as desired in the building field.

Such colorimetric properties therefore result in a neutral color of the glazings in transmission and a neutral (example 6) or blue (example 7) color in exterior reflection, as currently desired in the building field.

According to another advantage, the solar-control stacks according to the present are extremely simple to manufacture, in particular by the cathode sputtering vacuum deposition technique referred to as magnetron sputtering.

Moreover, supplementary durability tests have shown that such layers could easily be deposited on face 2 of a single glazing, without risk of degradation thereof, by chemical action (moisture) or by mechanical action (abrasion of the stack).

The invention claimed is:

1. A glass article with a solar-control function, the article comprising:
   a glass substrate; and
   a stack of layers deposited on at least one face of the substrate,
   wherein the stack of layers comprises
   a metallic layer comprising chromium nickel nitride (NiCrN),
   layers of dielectric material(s), and
   a layer of titanium oxynitride of formula (I) having a thickness in a range of from 10 to 80 nm, $$TiN_xO_y \qquad (I),$$

wherein $1.00<x<1.20$ and
   wherein $0.01<y<0.10$,
   wherein the metallic layer is positioned between the layer of the titanium oxynitride and the at least face of the substrate, and
   wherein the metallic layer is deposited directly on the at least one face of the substrate.

2. The article of claim 1, wherein $0.02<y<0.08$.

3. The article of claim 1, wherein $1.05<x<1.20$.

4. The article of claim 1, wherein the thickness of the titanium oxynitride layer is in a range of from 15 to 60 nm.

5. The article of claim 1, wherein the stack further comprises, below and/or above the titanium oxynitride layer, a layer of dielectric material(s).

6. The article of claim 5, wherein the dielectric material or materials are silicon nitride, Al-doped silicon nitride, Zr-doped silicon nitride, or B-doped silicon nitride, aluminum nitride, tin oxide, a mixed oxide of zinc or tin of formula $Sn_yZn_zO_x$, silicon oxide, titanium oxide, silicon oxynitride of formula $SiO_xN_y$, or a mixture of two or more of any of these.

7. The article of claim 5, wherein the layer of dielectric material(s) comprises silicon nitride and has a thickness in a range of from 25 to 80 nm.

8. The article of claim 1, wherein the stack further comprises, below and/or above the titanium oxynitride layer, a layer of a metal,
   wherein the metal comprises chromium, nickel, titanium, niobium, or a mixture of at least two of these elements, and
   wherein the layer of metal has a thickness of less than 5 nm.

9. The article of claim 8, wherein the metal is Ti, Nb, or an alloy of nickel and chromium.

10. The article of claim 1,
    wherein the layer of the titanium oxynitride has a thickness in a range of from 15 to 50 nm.

11. The article of claim 10, wherein the metallic layer is based on chromium nickel nitride (NiCrN).

12. The article of claim 10, wherein the layers of dielectric material(s) in the stack, altogether, have a total thickness in a range of from 10 to 100 nm.

13. The article of claim 1, wherein the stack comprises a series of layers as follows, starting from the surface of the glass substrate:
    the metallic layer, having a thickness in a range of from 3 to 15 nm;
    the layer of the titanium oxynitride; and
    a layer based on silicon nitride, having a thickness of from 20 to 80 nm.

14. The article of claim 1, wherein the stack comprises a series of layers as follows, starting from the surface of the glass substrate:
    the metallic layer, having a thickness in a range of from 3 to 15 nm;
    a first layer comprising silicon nitride, having a thickness in a range of from 50 to 120 nm;
    the layer of the titanium oxynitride; and
    a second layer comprising silicon nitride, having a thickness in a range of from 20 to 80 nm.

15. The article of claim 1, wherein the layers of dielectric material(s), altogether, have a total thickness in a range of from 10 to 120 nm.

16. The article of claim 1, in the form of a glazing comprising only a single glass substrate.

17. The article of claim 8, wherein the article has undergone a heat treatment.

18. The article of claim 1, which is a laminated glazing consisting of an assembly of at least two glass substrates connected together by a thermoplastic sheet.

19. The article of claim 18, wherein the thermoplastic sheet comprises polyvinyl butyral (PVB).

20. The article of claim 1, having 4 or 5 total layers.

21. The article of claim 1, wherein the metallic layer consists of NiCrN.

* * * * *